(12) United States Patent
Kouchi

(10) Patent No.: US 9,612,397 B2
(45) Date of Patent: Apr. 4, 2017

(54) PHOTOELECTRIC HYBRID SUBSTRATE

(71) Applicant: SUMITOMO ELECTRIC PRINTED CIRCUITS, INC., Koka-shi, Shiga (JP)

(72) Inventor: Masahiko Kouchi, Shiga (JP)

(73) Assignee: SUMITOMO ELECTRIC PRINTED CIRCUITS, INC., Koka-shi, Shiga (JP)

( * ) Notice: Subject to any disclaimer, the term of this patent is extended or adjusted under 35 U.S.C. 154(b) by 0 days.

(21) Appl. No.: 14/914,268

(22) PCT Filed: Aug. 28, 2014

(86) PCT No.: PCT/JP2014/072512
§ 371 (c)(1),
(2) Date: Feb. 25, 2016

(87) PCT Pub. No.: WO2015/033845
PCT Pub. Date: Mar. 12, 2015

(65) Prior Publication Data
US 2016/0216444 A1    Jul. 28, 2016

(30) Foreign Application Priority Data

Sep. 6, 2013  (JP) ................................ 2013-184749
Aug. 20, 2014  (JP) ................................ 2014-167974

(51) Int. Cl.
| G02B 6/122 | (2006.01) |
| G02B 6/42 | (2006.01) |
| G02B 6/43 | (2006.01) |
| G02B 6/12 | (2006.01) |

(52) U.S. Cl.
CPC ........... *G02B 6/122* (2013.01); *G02B 6/4283* (2013.01); *G02B 6/43* (2013.01); *G02B 2006/12104* (2013.01)

(58) Field of Classification Search
None
See application file for complete search history.

(56) References Cited

U.S. PATENT DOCUMENTS

| 3,312,924 | A | * | 4/1967 | Cross | .................. C03C 3/321 257/2 |
| 2002/0018633 | A1 | * | 2/2002 | Imaizumi | ................. G02B 6/12 385/132 |
| 2008/0124024 | A1 | * | 5/2008 | Shioda | ............... G02B 6/12002 385/31 |
| 2011/0013868 | A1 | * | 1/2011 | Suzumura | ............ G02B 6/0001 385/32 |

(Continued)

FOREIGN PATENT DOCUMENTS

| JP | H06-281831 A | 10/1994 |
| JP | 2003-043281 A | 2/2003 |

(Continued)

*Primary Examiner* — Omar R Rojas
(74) *Attorney, Agent, or Firm* — Drinker Biddle & Reath LLP

(57) ABSTRACT

A photoelectric hybrid substrate according to the present invention includes an insulating layer that contains a fluororesin as a main component, and conductor layers stacked on two surfaces of the insulating layer. The photoelectric hybrid substrate includes an optical communication mechanism configured to propagate an optical signal in the insulating layer by using reflection at inner surfaces of the conductor layers.

7 Claims, 2 Drawing Sheets

(56) References Cited

U.S. PATENT DOCUMENTS

2015/0253486 A1* 9/2015 Verger .............. B32B 17/10036
　　　　　　　　　　　　　　　　　　　　　　362/606

FOREIGN PATENT DOCUMENTS

| JP | 2003-248129 A | 9/2003 |
| JP | 2004-170484 A | 6/2004 |
| JP | 2004-325636 A | 11/2004 |
| JP | 2009-156952 A | 7/2009 |
| JP | 2009-175431 A | 8/2009 |

* cited by examiner

PHOTOELECTRIC HYBRID SUBSTRATE

TECHNICAL FIELD

The present invention relates to a photoelectric hybrid substrate that can transmit an optical signal and an electrical signal.

BACKGROUND ART

In recent years, requirements for realization of high-processing speed in electrical equipment have been increasing. With the requirements, it has been desired to realize a high-transmission speed of electrical signals in an electric circuit board installed in the electrical equipment. Under this background, transmission through optical signals has been conceived as means for overcoming the limit of the transmission speed of electrical signals. Various photoelectric hybrid substrates in which an electric circuit board and an optical waveguide are hybridized have been proposed.

An example of such a photoelectric hybrid substrate that has been proposed is a photoelectric hybrid substrate which includes a substrate and an optical waveguide stacked on the substrate, the optical waveguide including a lower cladding layer, a core layer, and an upper cladding layer that are sequentially formed on the substrate so as to be parallel to the substrate (for example, Japanese Unexamined Patent Application Publication No. 2004-325636). In this photoelectric hybrid substrate, an electrical signal is transmitted through electrical wiring provided on a surface of the substrate, and an optical signal is transmitted by reflecting the optical signal at an interface between the core layer and the cladding layer that form the optical waveguide.

CITATION LIST

Patent Literature
PTL 1: Japanese Unexamined Patent Application Publication No. 2004-325636

SUMMARY OF INVENTION

Technical Problem

The photoelectric hybrid substrates that have been hitherto proposed are produced by separately forming an optical waveguide and an electric circuit board and then combining the optical waveguide and the electric circuit board, or by mounting an electronic component on an electric circuit board and then forming an optical waveguide. Therefore, a mechanical error may occur when the optical waveguide and the electric circuit board are combined. Consequently, optical adjustment in the subsequent mounting of a light-receiving/emitting element becomes a complex step. In the structure in which an optical waveguide is provided on an electric circuit board, the optical waveguide also functions as a mounted component, resulting in a decrease in the area of the electric circuit board on which an electronic component can be mounted.

The present invention has been made in view of the circumstances described above. An object of the present invention is to provide a photoelectric hybrid substrate which has good productivity and in which a wide region for mounting an electronic component can be ensured.

Solution to Problem

A photoelectric hybrid substrate according to an embodiment of the present invention that has been made in order to solve the problem described above is a photoelectric hybrid substrate including an insulating layer that contains a fluororesin as a main component, and conductor layers stacked on two surfaces of the insulating layer, in which the photoelectric hybrid substrate includes an optical communication mechanism configured to propagate an optical signal in the insulating layer by using reflection at inner surfaces of the conductor layers.

Advantageous Effects of Invention

According to the photoelectric hybrid substrate of the present invention, the photoelectric hybrid substrate has good productivity, and a wide region for mounting an electronic component can be ensured.

Figure 1:
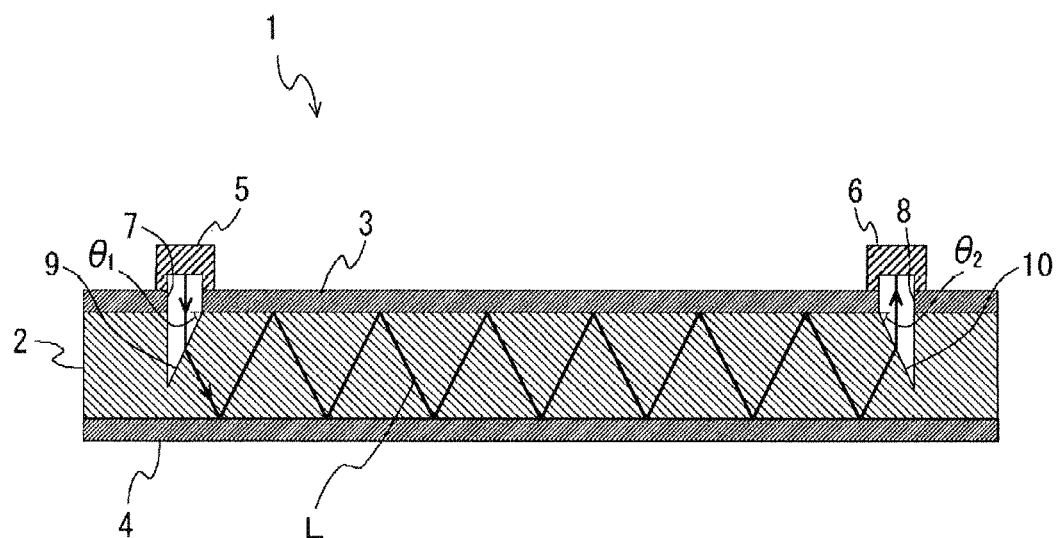
FIG. 1 is a schematic cross-sectional view of a photoelectric hybrid substrate according to a first embodiment of the present invention.

REFERENCE SIGNS LIST 1, 11, 21, 31 photoelectric hybrid substrate
2, 12 insulating layer
3, 24, 32 first conductor layer
4, 25, 33 second conductor layer
5 light-emitting device
6, 34 photodetector
7 first through-hole
8, 35 second through-hole
9 first inclined plane
10 second inclined plane
13 glass fabric
22 first insulating layer
23 second insulating layer
26 third conductor layer
27 first light-emitting device
28 second light-emitting device
29 first photodetector
30 second photodetector
L, $L_1$, $L_2$, $L_3$, $L_4$ path
$\theta_1$ inclination angle of first inclined plane
$\theta_2$ inclination angle of second inclined plane

DESCRIPTION OF EMBODIMENTS

Description of Embodiments of Invention

A photoelectric hybrid substrate according to an embodiment of the present invention that has been made in order to solve the problem described above is a photoelectric hybrid substrate including an insulating layer that contains a fluororesin as a main component, and conductor layers stacked on two surfaces of the insulating layer, in which the photoelectric hybrid substrate includes an optical communication mechanism configured to propagate an optical signal in the insulating layer by using reflection at inner surfaces of the conductor layers.

Polymethylmethacrylate (PMMA) and polystyrene (PS), which have been widely used as optical materials for visible light, have carbon-hydrogen bonds (C—H bonds) in molecular chains thereof. Therefore, an absorption spectrum in the near-infrared region shows a peak due to coupling of harmonics of stretching vibration of a C—H bond and deformation vibration thereof. In these resins, optical communication at a low loss is not achieved over an optical communication wavelength range (1.0 to 1.7 µm). Since the photoelectric hybrid substrate includes an insulating layer containing a fluororesin as a main component, the loss of optical signals in the optical communication wavelength range is smaller than that in the case of using another resin, and optical transmission at a low loss is realized. Specifically, by using a fluororesin, an absorption peak in the optical communication wavelength range (0.8 µm or more and 1.7 µm or less) is reduced, and optical transmission loss can be extremely reduced over this optical communication wavelength range. In the photoelectric hybrid substrate, the insulating layer that forms an electric circuit board is used as a transmission path of optical signals. Accordingly, an optical waveguide need not be provided on the substrate, and a region where an electronic component can be mounted can be increased, thus improving the degree of freedom of mounting of an electronic component. Furthermore, optical signals are propagated in the insulating layer by using reflection at inner surfaces of the conductor layers, that is, at surfaces of the conductor layers, the surfaces being disposed on the insulating layer side. Therefore, optical signals can be transmitted even when the insulating layer has a small thickness, and the photoelectric hybrid substrate can be configured to have a small thickness. Herein, the "low loss" means that optical signals propagating in an insulating layer can be transmitted, and that, for example, when light having a wavelength of 0.8 µm or more and 1.7 µm or less is incident on an insulating layer, a transmittance of the light in the insulating layer is 50% or more. The term "transmittance" refers to a transmittance of light and a ratio of a transmitted light flux emitted from an insulating layer to a parallel light flux incident on the insulating layer.

The inner surfaces (surfaces on the insulating layer side) of the conductor layers each preferably have an arithmetic mean roughness Ra of 1.5 µm or less. When the arithmetic mean roughness Ra of each of the inner surfaces (surfaces on the insulating layer side) of the conductor layers is in this range, the loss of optical signals on the inner surfaces of the conductor layers during reflection is reduced, and optical transmission at a lower loss can be realized.

The insulating layer preferably has an average thickness of 21 µm or more and 120 µm or less. When the average thickness of the insulating layer is in this range, the path of optical signals propagating in the insulating layer becomes short, and a loss of the optical signals during propagation in the insulating layer is reduced. Thus, the optical signals are transmitted at a lower loss. In addition, a reduction in the thickness of the photoelectric hybrid substrate can be realized. Furthermore, deformation and damage of the photoelectric hybrid substrate are prevented.

In the photoelectric hybrid substrate, the optical communication mechanism preferably includes no separate optical waveguide in the insulating layer. In this case, the photoelectric hybrid substrate can be prepared by a simple process, and the cost of the photoelectric hybrid substrate can be reduced. It is sufficient that the photoelectric hybrid substrate includes a conductor layer at a position at which optical signals that propagate in the insulating layer reflect. For example, by using a power supply line or a ground (GND) line as the conductor layer, optical transmission at a low loss can be realized without providing a separate optical waveguide in the insulating layer. Herein, the term "separate optical waveguide" refers to a light transmission path in which a portion where light is reflected is additionally formed by adding a member for mainly forming an optical waveguide in an insulating layer and a conductor layer or by performing a process for mainly forming an optical waveguide in an insulating layer and a conductor layer.

In the photoelectric hybrid substrate, the optical communication mechanism preferably includes a light-emitting portion that emits an optical signal and a light-receiving portion that receives the optical signal, the light-emitting portion preferably includes a through-hole formed in one of the pair of conductor layers and a light-emitting device that emits an optical signal to this through-hole, and the light-receiving portion preferably includes a through-hole formed in one of the pair of conductor layers and a photodetector that receives the optical signal emitted from this through-hole. By forming an optical communication mechanism that propagates optical signals in this manner, the photoelectric hybrid substrate can be produced more easily and more reliably.

In the photoelectric hybrid substrate, a pair of surfaces of the insulating layer exposed in the through-hole of the light-emitting portion and in the through-hole of the light-receiving portion preferably each have an inclined plane that is inclined outwardly in a direction in which the light-emitting portion and the light-receiving portion face each other and extends to the inside of the insulating layer, and the inclined plane preferably has an inclination angle of 64° or more and 68° or less. In this manner, the photoelectric hybrid substrate preferably has a structure in which a pair of surfaces of the insulating layer exposed in the through-holes are inclined at an angle in the above range. With this structure, an angle at which an optical signal emitted from the light-emitting device is incident from air onto a surface of the insulating layer that contains a fluororesin as a main component, and an angle at which the optical signal is emitted from a surface of the insulating layer toward the photodetector to air become close to the Brewster's angle. Consequently, reflection of optical signals at the surfaces of the insulating layer is reduced, and thus the loss of optical signals is further reduced.

The optical signal of the optical communication mechanism preferably has a wavelength of 0.8 µm or more and 1.7 µm or less. In the photoelectric hybrid substrate, the insulating layer that contains a fluororesin as a main component is used as a transmission path of optical signals. With this structure, optical signals can be transmitted more reliably at a low loss.

In the photoelectric hybrid substrate, a glass fabric is preferably embedded in a middle layer of the insulating layer. By embedding a glass fabric in a middle layer of the insulating layer, rigidity of the photoelectric hybrid substrate is increased. Furthermore, the glass fabric allows optical signals that propagate in the insulating layer to travel by reflection. Accordingly, the path of the optical signals that propagate in the insulating layer becomes short, and transmission of the optical signals by the photoelectric hybrid substrate can be performed at a lower loss.

The glass fabric preferably has an average linear density of 50 fibers/25 mm or more. When the average linear density of the glass fabric is in this range, the glass fabric has a high reflectance, and optical signals that propagate in the insulating layer can be reflected reliably at the layer of the glass fabric. Therefore, the optical signals are transmitted at a lower loss.

Details of Embodiments of Invention

Details of photoelectric hybrid substrates according to embodiments of the present invention will now be described with reference to the drawings.

First Embodiment

A photoelectric hybrid substrate 1 in FIG. 1 includes an insulating layer 2 that contains a fluororesin as a main component, and a first conductor layer 3 and a second conductor layer 4 that are stacked on two surfaces of the insulating layer 2. The photoelectric hybrid substrate 1 includes an optical communication mechanism configured so that optical signals are reflected at inner surfaces of the first conductor layer 3 and the second conductor layer 4 to propagate the optical signals in the insulating layer 2. In FIG. 1, symbol L schematically illustrates a path of an optical signal.

<Conductor Layer>

The first conductor layer 3 and the second conductor layer 4, which are a pair of conductor layers, are stacked on two surfaces of the insulating layer 2 and transmit electrical signals. The first conductor layer 3 and the second conductor layer 4 may each be formed as a wiring pattern. Electronic components are mounted on the outer surface sides of the first conductor layer 3 and the second conductor layer 4. A coupling agent is preferably fixed to a surface of each of the first conductor layer 3 and the second conductor layer 4 by a chemical bond, the surface being disposed on the side on which the insulating layer 2 is stacked.

The lower limit of an average thickness of each of the first conductor layer 3 and the second conductor layer 4 is preferably 7 and more preferably 12 μm. The upper limit of the average thickness of each of the first conductor layer 3 and the second conductor layer 4 is preferably 25 μm, and more preferably 18 μm. When the average thickness of each of the first conductor layer 3 and the second conductor layer 4 exceeds the upper limit, it may become difficult to realize a reduction in the thickness of the photoelectric hybrid substrate 1. When the average thickness of each of the first conductor layer 3 and the second conductor layer 4 is less than the lower limit, the resistances of the first conductor layer 3 and the second conductor layer 4 increase, and electrically conductive performance may decrease.

The first conductor layer 3 and the second conductor layer 4 allow optical signals that propagate in the insulating layer 2 to reflect at inner surfaces thereof (surfaces on the insulating layer 2 side). For this purpose, the inner surfaces of the first conductor layer 3 and the second conductor layer 4 preferably have low optical signal absorption and have a high reflectance so as to suppress a loss of the optical signals that propagate in the insulating layer 2.

The upper limit of an arithmetic mean roughness Ra of the inner surface of each of the first conductor layer 3 and the second conductor layer 4 is preferably 1.5 μm, and more preferably 0.1 μm. The lower limit of the arithmetic mean roughness Ra of the inner surface of each of the first conductor layer 3 and the second conductor layer 4 is preferably 0.001 μm. When the arithmetic mean roughness Ra of the inner surface of each of the first conductor layer 3 and the second conductor layer 4 exceeds the upper limit, optical signals are scattered during the reflection at the first conductor layer 3 and the second conductor layer 4, resulting in an increase in the loss of an optical signal component. Consequently, the effect of reducing the loss of optical signals may not be obtained. When the arithmetic mean roughness Ra of the inner surface of each of the first conductor layer 3 and the second conductor layer 4 is less than the lower limit, the production cost is increased, and an adhesive strength with the insulating layer 2 decreases, and thus the first conductor layer 3 and the second conductor layer 4 may be easily detached. The arithmetic mean roughness Ra can be determined in accordance with JIS-B0601 (2013). Specifically, for example, the insulating layer 2 is chemically removed from the photoelectric hybrid substrate 1 to expose the interfaces between the insulating layer 2 and the first conductor layer 3 and between the insulating layer 2 and the second conductor layer 4. Subsequently, a roughness of each of the exposed surfaces of the first conductor layer 3 and the second conductor layer 4 is measured under the conditions of a standard length and a cutoff value of 2 mm, and an evaluation length of 10 mm. The arithmetic mean roughness Ra can be determined as described above. Alternatively, since the insulating layer 2 has a high transmittance, the arithmetic mean roughness Ra may be optically measured.

The material that forms the first conductor layer 3 and the second conductor layer 4 is preferably a metal having a low electrical resistivity. Examples thereof include aluminum, silver, gold, and copper, etc. The first conductor layer 3 and the second conductor layer 4 are preferably formed using a foil of any of these metals or by metal plating. In particular, in order to suppress the loss due to scattering of optical signals on the first conductor layer 3 and the second conductor layer 4 during the reflection of the optical signals, the first conductor layer 3 and the second conductor layer 4 are preferably formed by bonding, to the insulating layer 2, a metal foil, a surface of which is not roughened, the surface being disposed on the side on which the insulating layer 2 is stacked. This metal foil is preferably a copper foil.

(Coupling Agent)

The coupling agent is used for increasing a bonding strength between the first conductor layer 3 and the insulating layer 2 and between the second conductor layer 4 and the insulating layer 2. This coupling agent is preferably a silane coupling agent, and more preferably a silane coupling agent having a functional group containing a N atom or a S atom (hereinafter may be referred to as "hydrophilic organic functional group"). Such a silane coupling agent chemically bonds to a fluororesin that forms the insulating layer 2. The chemical bond between the silane coupling agent and the fluororesin of the insulating layer 2 may include only a covalent bond, or a covalent bond and a hydrogen bond. Furthermore, some of the hydrophilic organic functional groups chemically bond to the inner surfaces of the first conductor layer 3 and the second conductor layer 4.

Examples of the functional group containing a N atom include an amino group and a ureido group.

Examples of the silane coupling agent having a functional group containing a N atom include aminoalkoxysilanes, ureidoalkoxysilanes, and derivatives thereof.

Examples of the aminoalkoxysilanes include 3-aminopropyltrimethoxysilane, 3-aminopropyltriethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, and N-phenyl-3-aminopropyltrimethoxysilane.

Examples of the derivatives of aminoethoxysilane include ketimines such as 3-triethoxysilyl-N-(1,3-dimethyl-butylidene)propylamine, and salts of a silane coupling agent, such as an acetate of N-(vinylbenzyl)-2-aminoethyl-3-aminopropyltrimethoxysilane.

Examples of the ureidoalkoxysilanes include 3-ureidopropyltriethoxysilane, 3-ureidopropyltrimethoxysilane, and γ-(2-ureidoethyl)aminopropyltrimethoxysilane.

Examples of the functional group containing a S atom include a mercapto group and a sulfide group.

Examples of the silane coupling agent having a functional group containing a S atom include mercaptoalkoxysilanes, sulfide alkoxysilanes, and derivatives thereof.

Examples of the mercaptoalkoxysilanes include 3-mercaptopropyltrimethoxysilane, 3-mercaptopropyl(dimethoxy)methylsilane, and mercaptoorganyl(alkoxysilanes).

Examples of the sulfide alkoxysilanes include bis(3-(triethoxysilyl)propyl)tetrasulfide and bis(3-(triethoxysilyl)propyl)disulfide.

The silane coupling agent may be a silane coupling agent to which a modifying group is introduced. The modifying group is preferably a phenyl group.

Among the silane coupling agents exemplified above, 3-aminopropyltriethoxysilane, N-phenyl-3-aminopropyltrimethoxysilane, 3-ureidopropyltriethoxysilane, 3-mercaptopropyltrimethoxysilane, and bis(3-(triethoxysilyl)propyl)tetrasulfide are particularly preferable.

As the coupling agent, other coupling agents may be used instead of, or in addition to the silane coupling agent having a functional group containing a N atom or a S atom. The other coupling agents preferably have a functional group having reactivity to the fluororesin of the insulating layer 2 or a radical of the fluororesin and, for example, a functional group that can chemically bond to the first conductor layer 3 and the second conductor layer 4. For example, titanium coupling agents can be used.

Examples of the titanium coupling agents include isopropyltriisostearoyl titanate, isopropyltristearoyl titanate, isopropyltrioctanoyl titanate, isopropyldimethacrylisostearoyl titanate, isopropyltridodecylbenzenesulfonyl titanate, isopropylisostearoyldiacryl titanate, isopropyltri(dioctylphosphate) titanate, isopropyltricumylphenyl titanate, isopropyltris(dioctylpyrophosphate) titanate, isopropyltri(n-aminoethyl-aminoethyl) titanate, tetraisopropylbis(dioctylphosphite) titanate, tetraoctylbis(ditridecylphosphite) titanate, tetra(2,2-diallyloxymethyl-1-butyl)bis(ditridecyl)phosphite titanate, dicumylphenyloxyacetate titanate, bis(dioctylpyrophosphate)oxyacetate titanate, diisostearoylethylene titanate, bis(dioctylpyrophosphate)ethylene titanate, bis(dioctylpyrophosphate)diisopropyl titanate, tetramethyl orthotitanate, tetraethyl orthotitanate, tetrapropyl orthotitanate, tetraisopropyltetraethyl orthotitanate, tetrabutyl orthotitanate, butylpolytitanate, tetraisobutyl orthotitanate, 2-ethylhexyl titanate, stearyl titanate, cresyl titanate monomer, cresyl titanate polymer, diisopropoxy-bis-(2,4-pentadionate)titanium (IV), diisopropyl-bis-triethanolamino titanate, octylene glycol titanate, titanium lactate, acetoacetic ester titanate, diisopropoxy bis(8-acetylacetonato)titanium, di-n-butoxy bis(triethanolaluminato)titanium, dihydroxybis(lactato)titanium, titanium-isopropoxyoctylene glycolate, tetra-n-butoxytitanium polymer, tri-n-butoxytitanium monostearate polymer, butyl titanate dimer, titanium acetylacetonate, polytitanium titanium acetylacetonate, titanium octylene glycolate, titanium lactate ammonium salt, titanium lactate ethyl ester, titanium triethanol aminate, and polyhydroxytitanium stearate.

<Insulating Layer>

The insulating layer 2 is an inner layer of an electric circuit board formed by stacking the first conductor layer 3 and the second conductor layer 4 on two surfaces of the insulating layer 2. The insulating layer 2 contains a fluororesin as a main component. The insulating layer 2 may contain optional components other than the fluororesin, as required, as long as the insulating layer 2 can propagate optical signals at a low loss. Herein, the term "main component" refers to a component having the highest content among components constituting the insulating layer 2 and, for example, a component having a content of 50% by mass or more.

The lower limit of an average thickness of the insulating layer 2 is preferably 21 μm, and more preferably 53 μm. The upper limit of the average thickness of the insulating layer 2 is preferably 120 μm, and more preferably 106 μm. When the average thickness of the insulating layer 2 exceeds the upper limit, the path of optical signals that propagate in the insulating layer 2 becomes long, a loss is increased, and thus the effect of reducing the loss of the optical signals may not be obtained. In addition, it may become difficult to realize a reduction in the thickness of the photoelectric hybrid substrate 1. When the average thickness of the insulating layer 2 is less than the lower limit, rigidity of the photoelectric hybrid substrate 1 decreases, and deformation or damage of the photoelectric hybrid substrate 1 may easily occur.

The lower limit of a transmittance of the insulating layer 2 to the wavelength of optical signals that propagate in the insulating layer 2 is preferably 50%, and more preferably 60%. The upper limit of the transmittance is preferably 90%, and more preferably 80%. When the transmittance is less than the lower limit, communication in which the insulating layer 2 between a light-emitting portion and a light-receiving portion described below is used as an optical waveguide may not be performed. When the transmittance exceeds the upper limit, it is necessary to add a component for adjusting the intensity of the incident light, which may result in an increase in the cost of the photoelectric hybrid substrate 1.

(Fluororesin)

The term "fluororesin" refers to a resin in which at least one hydrogen atom bonded to a carbon atom that forms a repeating unit of a polymer chain is substituted with a fluorine atom or an organic group containing a fluorine atom (hereinafter may be referred to as "fluorine atom-containing group"). The fluorine atom-containing group is a group in which at least one hydrogen atom in a linear or branched organic group is substituted with a fluorine atom. Examples of the fluorine atom-containing group include fluoroalkyl groups, fluoroalkoxy groups, and fluoropolyether groups.

The term "fluoroalkyl group" refers to an alkyl group in which at least one hydrogen atom is substituted with a fluorine atom and covers a "perfluoroalkyl group". Specifically, the term "fluoroalkyl group" covers a group in which all hydrogen atoms of an alkyl group are each substituted with a fluorine atom, a group in which all hydrogen atoms other than one hydrogen atom at the end of an alkyl group are each substituted with a fluorine atom, etc.

The term "fluoroalkoxy group" refers to an alkoxy group in which at least one hydrogen atom is substituted with a fluorine atom and covers a "perfluoroalkoxy group". Specifically, the term "fluoroalkoxy group" covers a group in which all hydrogen atoms of an alkoxy group are each substituted with a fluorine atom, a group in which all hydrogen atoms other than one hydrogen atom at the end of an alkoxy group are each substituted with a fluorine atom, etc.

The term "fluoropolyether group" refers to a monovalent group that has a plurality of alkylene oxide chains as a repeating unit and has an alkyl group or a hydrogen atom at an end thereof, the monovalent group having a group in which at least one hydrogen atom of the alkylene oxide chains or the alkyl group or hydrogen atom at the end is substituted with a fluorine atom. The term "fluoropolyether group" covers a "perfluoropolyether group" that has a plurality of perfluoroalkylene oxide chains as a repeating unit.

Preferred examples of the fluororesin include tetrafluoroethylene hexafluoropropylene copolymers (FEP), tetrafluoroethylene perfluoroalkyl vinyl ether copolymers (PFA), polytetrafluoroethylene (PTFE), and tetrafluoroethylene perfluorodioxole copolymers (TFE/PDD).

(Optional Component)

Examples of the optional components include an engineering plastic, a flame retardant, a flame retardant assistant, an antioxidant, a reflection-imparting agent, a masking reagent, a lubricant, a processing stabilizer, a plasticizer, and a foaming agent.

The engineering plastic may be selected from known engineering plastics in accordance with properties required for the insulating layer 2 and used. Typically, an aromatic polyether ketone can be used.

This aromatic polyether ketone is a thermoplastic resin having a structure in which benzene rings are bonded in the para position and the benzene rings are connected to each other through a rigid ketone bond (—C=O) or a flexible ether bond (—O—). Typical examples thereof include polyether ketones (PEK) in which a ketone bond and an ether bond are alternately arranged and polyether ether ketones (PEEK) in which an ether bond, an ether bond, and a ketone bond are arranged in that order. Aromatic polyether ketones have good wear resistance, heat resistance, insulating properties, processability, bonding properties, etc. When an aromatic polyether ketone is incorporated in the insulating layer 2, for example, bonding properties of the insulating layer 2 to the first conductor layer 3 and the second conductor layer 4 are improved.

Commercially available aromatic polyether ketones can be used as the aromatic polyether ketones. Various grades of aromatic polyether ketones are commercially available. A single grade of a commercially available aromatic polyether ketone may be used alone. Alternatively, a plurality of grades of commercially available aromatic polyether ketones may be used in combination. Modified aromatic polyether ketones may also be used as the aromatic polyether ketones.

The content of the engineering plastic is not particularly limited, but is preferably 20:80 or more and 50:50 or less, and more preferably 35:65 or more and 45:55 or less in temis of a mass ratio with the fluororesin. When the content of the engineering plastic is less than the lower limit, properties of the insulating layer 2 may not be sufficiently improved. When the content of the engineering plastic exceeds the upper limit, advantageous properties of the fluororesin may not be sufficiently exhibited.

Various publicly known flame retardants can be used as the flame retardant. Examples thereof include halogen-based flame retardants such as bromine-based flame retardants and chlorine-based flame retardants.

Various publicly known flame retardant assistants can be used as the flame retardant assistant. An example thereof is antimony trioxide.

Various publicly known antioxidants can be used as the antioxidant. Examples thereof include phenol-based antioxidants.

Various publicly known reflection-imparting agents can be used as the reflection-imparting agent. An example thereof is a titanium oxide.

The insulating layer 2 is preferably subjected to ionizing radiation exposure. By exposing the insulating layer 2 to ionizing radiation, the fluororesin is radicalized. The ionizing radiation exposure is preferably performed under heating. The radicalization of the fluororesin may be performed by heating.

It is assumed that a hydrophilic organic functional group of the coupling agent is chemically bonded to a radical portion of the fluororesin, whereby the coupling agent is chemically bonded to the fluororesin. A large number of chemical bonds are present between the fluororesin and the coupling agent. It is believed that the chemical bonds include only a covalent bond or both a covalent bond and a hydrogen bond. In this manner, a coupling agent is chemically bonded to a radical portion of the fluororesin, and the coupling agent is further chemically bonded to the first conductor layer 3 and the second conductor layer 4 as described above, thereby forming a crosslinked structure in which the coupling agent is interposed between the fluororesin and the first conductor layer 3 and between the fluororesin and the second conductor layer 4. As a result, the fluororesin is crosslinked with a surface of the first conductor layer 3 and a surface of the second conductor layer 4. Accordingly, even when the insulating layer 2 is formed of a fluororesin, the bonding strength between the insulating layer 2 and the first conductor layer 3 and between the insulating layer 2 and the second conductor layer 4 can be enhanced.

Since the fluororesin is radicalized, fluororesin molecules are crosslinked to each other, and in the case where the insulating layer 2 contains an engineering plastic such as an aromatic polyether ketone, the fluororesin and the engineering plastic are crosslinked. The bond between fluororesin molecules and the bond between the fluororesin and the engineering plastic formed by crosslinking are each a covalent bond. This covalent bond is stronger than the intermolecular bond (F—F bond) of the fluororesin. Therefore, according to the photoelectric hybrid substrate 1, fluororesin molecules are crosslinked to each other or the fluororesin is crosslinked with an engineering plastic, and thus mechanical strength of the insulating layer 2 can be improved.

Furthermore, it is assumed that the silane coupling agent is present on the order of Angstroms between the first conductor layer 3 and the insulating layer 2 and between the second conductor layer 4 and the insulating layer 2. Therefore, the coupling agent does not substantially affect the surface properties of the first conductor layer 3 and the second conductor layer 4, and the surfaces of the first conductor layer 3 and the second conductor layer 4 are not roughened. Thus, it is believed that degradation of the signal transmission performance due to the coupling agent does not substantially occur.

Even when a coupling agent is not present on the first conductor layer 3 and the second conductor layer 4, in the case where the fluororesin is radicalized by ionizing radiation exposure or the like, a radical portion of the fluororesin forms a cross-liked structure with the first conductor layer 3 and the second conductor layer 4. Therefore, even when the insulating layer 2 is formed of a fluororesin, the bonding strength between the insulating layer 2 and the first conductor layer 3 and between the insulating layer 2 and the second conductor layer 4 can be enhanced by crosslinking the fluororesin and surfaces of the first conductor layer 3 and the second conductor layer 4 without providing a coupling agent on the first conductor layer 3 and the second conductor layer 4.

Herein, examples of the ionizing radiation include charged particle beams such as electron beams and high-energy ion beams, high-energy electromagnetic waves such as γ rays and X rays, and neutron beams. Among these, electron beams are preferable. This is because an electron-beam generator is relatively inexpensive, an electron beam is obtained at a high output, and the degree of crosslinking is easily controlled.

The dose of the ionizing radiation exposure may be appropriately determined because the effect is obtained in a wide range. The dose of the ionizing radiation exposure is preferably about 50 to 800 KGy. When the dose of the ionizing radiation is less than the lower limit, crosslinking is insufficient. Accordingly, the effect of improving mechanical strength of the insulating layer 2, the effect of improving bonding strength between the first conductor layer 3 and insulating layer 2 and between the second conductor layer 4 and the insulating layer 2, etc. may not be sufficiently obtained. When the dose of the ionizing radiation exceeds the upper limit, degradation of the resin component (scission of the polymer main chain) excessively occurs, and mechanical strength of the insulating layer 2 may decrease. In contrast, when the dose is 50 to 800 kGy, crosslinking can sufficiently proceed, degradation of the resin component is suppressed, and sufficient mechanical strength, bonding strength, etc. are obtained.

The ionizing radiation exposure is preferably performed in a low-oxygen or oxygen-free atmosphere in a state in which the insulating layer 2 or a resin material immediately before the formation of the insulating layer 2 is heated.

By performing ionizing radiation exposure in a low-oxygen or oxygen-free atmosphere, bonding strength of the insulating layer 2 to the first conductor layer 3 and the second conductor layer 4 can be improved. Specifically, when the oxygen concentration is less than 1,000 ppm, the effect of improving bonding strength is obtained. When the oxygen concentration is 500 ppm or less, a significant effect of improving bonding strength is obtained. When the oxygen concentration is 100 ppm or less, a more significant effect of improving bonding strength is obtained. From the viewpoint of the stability and ease of the control of the oxygen concentration during ionizing radiation exposure, the oxygen concentration is preferably 10 ppm or less.

The heating temperature during ionizing radiation exposure is preferably equal to or higher than a melting point of the fluororesin, which is a main component of the insulating layer 2. The heating temperature is preferably equal to or lower than a temperature 80° C. higher than the melting point, and more preferably equal to or lower than a temperature 40° C. higher than the melting point. When the hearing is performed at a temperature higher than the melting point of the resin, radicalization and crosslinking of the fluororesin can be appropriately accelerated. On the other hand, when the upper limit of the heating temperature is equal to or lower than a temperature 80° C. higher than the melting point of the fluororesin, thermal degradation of the fluororesin (scission of the polymer main chain) can be suppressed, and decreases in mechanical strength and bonding strength of the insulating layer 2 can be suppressed.

When the insulating layer 2 contains an engineering plastic, the heating temperature during ionizing radiation exposure is preferably equal to or higher than the melting points of the fluororesin and the engineering plastic. By determining the hearing temperature in this manner, the fluororesin and the engineering plastic are crosslinked to further increase mechanical strength, etc. of the insulating layer 2.

<Optical Communication Mechanism>

The optical communication mechanism is a mechanism including a light-emitting portion that emits an optical signal and a light-receiving portion that receives the optical signal, in which the optical signal emitted from the light-emitting portion is propagated in the insulating layer 2 and received in the light-receiving portion. This optical communication mechanism does not constitute a separate optical waveguide in the insulating layer 2 but uses the insulating layer 2, the first conductor layer 3, and the second conductor layer 4, which form an electric circuit board, as an optical waveguide.

(Light-Emitting Portion)

The light-emitting portion includes a first through-hole 7 formed in the first conductor layer 3, and a light-emitting device 5 that emits an optical signal to the first through-hole 7.

The light-emitting device 5 is mounted on the outer surface of the first conductor layer 3. A light-emitting diode (LED), a laser diode (LD), a vertical-cavity surface-emitting laser (VCSEL), or the like may be used as the light-emitting device 5. From the viewpoint of the ease of mounting, a VCSEL is preferably used in the structure of the photoelectric hybrid substrate 1.

The lower limit of the wavelength of an optical signal emitted from the light-emitting device 5 is preferably 0.8 and more preferably 0.84 μm. The upper limit of the wavelength of an optical signal emitted from the light-emitting device 5 is preferably 1.7 μm, and more preferably 1.5 μm. In the case where the wavelength of the optical signal emitted exceeds the upper limit or is less than the lower limit, the loss of the optical signal when the optical signal travels in the insulating layer 2 that contains a fluororesin as a main component increases, and the effect of reducing the loss of optical signals may not be obtained.

A surface (first inclined plane 9) of the insulating layer 2 exposed in the first through-hole 7 is inclined outwardly in a direction in which the light-emitting portion and the light-receiving portion face each other and extends to the inside of the insulating layer 2.

The lower limit of an inclination angle $\theta_1$ of the first inclined plane 9 is preferably 64°, and more preferably 65°. The upper limit of the inclination angle $\theta_1$ of the first inclined plane 9 is preferably 68°, and more preferably 67°. The inclination angle $\theta_1$ in the above range is an angle for which an incident angle of an optical signal emitted from the light-emitting device 5 on the first inclined plane 9 of the insulating layer 2 is made close to the Brewster's angle when the optical signal is incident from air to the fluororesin. In the case where the inclination angle $\theta_1$ of the first inclined plane 9 is less than the lower limit or exceeds the upper limit, an optical signal component reflected at the first inclined plane 9 increases when an optical signal emitted from the light-emitting device 5 is incident on the first inclined plane 9 of the insulating layer 2. Therefore, the effect of reducing the loss of optical signals may not be obtained.

The upper limit of the arithmetic mean roughness Ra of the first inclined plane 9 is preferably 1.5 μm, and more preferably 1.0 μm. When the arithmetic mean roughness Ra of the first inclined plane 9 exceeds the upper limit, the distance over which an optical signal can be transmitted by the optical communication mechanism may become short. In order to suppress the loss of an optical signal when the optical signal passes through the first inclined plane 9, diffuse reflection at the first inclined plane 9 is preferably as small as possible.

(Light-Receiving Portion)

The light-receiving portion includes a second through-hole 8 formed in the first conductor layer 3, and a photodetector 6 that receives an optical signal emitted from a surface of the insulating layer 2 through the second through-hole 8.

The photodetector 6 is mounted on the outer surface of the first conductor layer 3. Specifically, as illustrated in FIG. 1, the photodetector 6 is mounted on the same side of the photoelectric hybrid substrate 1 as the light-emitting device 5. A solar cell, a photodiode (PD), an avalanche photodiode (APD), or the like may be used as the photodetector 6. In particular, a PD having a band selection function is preferably used as the photodetector 6. By using a PD having a band selection function, the photoelectric hybrid substrate 1 can perform optical transmission at a more reliable frequency.

A surface (second inclined plane 10) of the insulating layer 2 exposed in the second through-hole 8 is inclined outwardly in a direction in which the light-emitting portion and the light-receiving portion face each other and extends to the inside of the insulating layer 2.

The lower limit of an inclination angle $\theta_2$ of the second inclined plane 10 is preferably 64°, and more preferably 65°. The upper limit of the inclination angle $\theta_2$ of the second inclined plane 10 is preferably 68°, and more preferably 67°. The inclination angle $\theta_2$ in the above range is an angle for which an incident angle of an optical signal on the second inclined plane 10 when the optical signal is emitted from the inside of the insulating layer 2 to the photodetector 6 is made close to the Brewster's angle when the optical signal is emitted from the inside of the fluororesin to air. In the case where the inclination angle $\theta_2$ of the second inclined plane 10 is less than the lower limit or exceeds the upper limit, an optical signal component reflected at the second inclined plane 10 increases when the optical signal is emitted from the second inclined plane 10 of the insulating layer 2 to air. Therefore, the loss of optical signals may increase.

The upper limit of the arithmetic mean roughness Ra of the second inclined plane 10 is preferably 1.5 and more preferably 1.0 μm. When the arithmetic mean roughness Ra of the second inclined plane 10 exceeds the upper limit, the distance over which an optical signal can be transmitted by the optical communication mechanism may become short. In order to suppress the loss of an optical signal when the optical signal passes through the second inclined plane 10, diffuse reflection at the second inclined plane 10 is preferably as small as possible.

It is sufficient that optical signals emitted from the light-emitting device 5 are received by the photodetector 6 so that the information of the optical signals can be recognized. Therefore, a loss may be somewhat generated on the optical-signal transmission path of the photoelectric hybrid substrate 1. For example, the photoelectric hybrid substrate 1 may have a structure in which some of the optical signals leak from an open lateral side of the insulating layer 2 to the outside.

[Advantages]

According to the photoelectric hybrid substrate 1, the insulating layer 2 that propagates optical signals contains as a fluororesin as a main component. Therefore, the photoelectric hybrid substrate 1 can transmit optical signals at an extremely low loss over an optical communication wavelength range (0.8 μm or more and 1.7 μm or less).

Since the photoelectric hybrid substrate 1 propagates optical signals while reflecting the optical signals at the first conductor layer 3 and the second conductor layer 4, the optical signals can be propagated even in the insulating layer 2 having a small thickness, and thus a reduction in the thickness of the photoelectric hybrid substrate 1 can be realized. Furthermore, since the thickness of the insulating layer 2 of the photoelectric hybrid substrate 1 can be reduced, a path of optical signals that propagate in the insulating layer 2 can be shortened, and optical transmission at a lower loss can be realized.

According to the photoelectric hybrid substrate 1, a separate optical waveguide need not be formed in the insulating layer 2. Therefore, the insulating layer 2, the first conductor layer 3, and the second conductor layer 4, all of which are used as an optical waveguide, can be formed in a process of producing an electric circuit board. In addition, a mechanical error which may occur when an optical waveguide and an electric circuit board are combined is not generated, and thus optical adjustment can be easily performed. Therefore, the photoelectric hybrid substrate 1 is good in terms of production cost.

Second Embodiment

Figure 2:
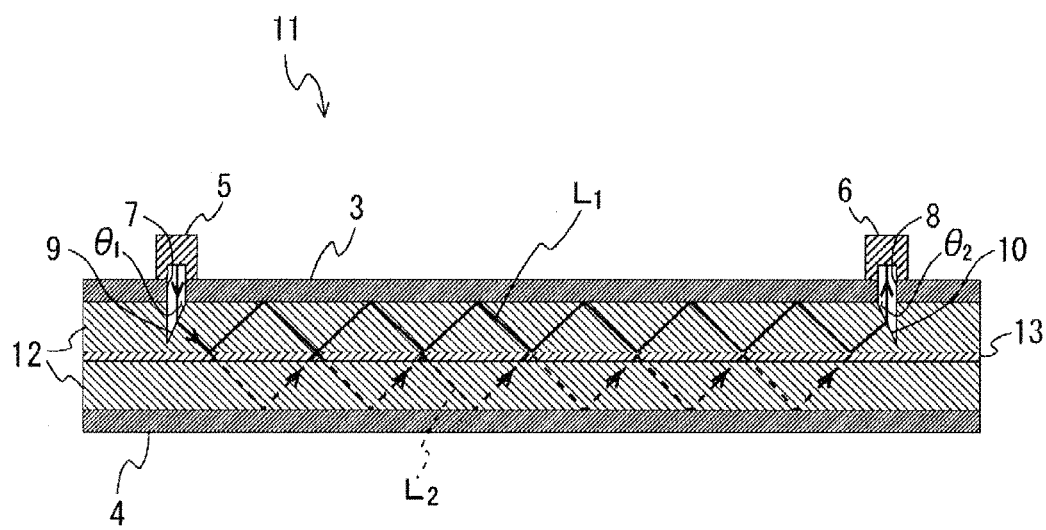
FIG. 2 is a schematic cross-sectional view of a photoelectric hybrid substrate according to a second embodiment of the present invention.

A photoelectric hybrid substrate 11 in FIG. 2 includes an insulating layer 12 that contains a fluororesin as a main component, and a first conductor layer 3 and a second conductor layer 4 that are stacked on two surfaces of the insulating layer 12. The photoelectric hybrid substrate 11 includes a glass fabric 13 embedded in a middle layer of the insulating layer 12, and an optical communication mechanism configured so that optical signals are reflected at an inner surface of the first conductor layer 3, an inner surface of the second conductor layer 4, and the glass fabric 13 to propagate the optical signals in the insulating layer 12. The photoelectric hybrid substrate 11 has the same structure as the photoelectric hybrid substrate 1 in FIG. 1 except that the glass fabric 13 is embedded in the middle layer of the insulating layer 12. Therefore, the same components are assigned the same reference numerals, and a description of those components is omitted.

Since the photoelectric hybrid substrate 11 includes the glass fabric 13 embedded at the center of the insulating layer 12 in the thickness direction, some of optical signals that propagate in the insulating layer 12 reflect at the glass fabric 13 and travel. Symbol $L_1$ shown by the solid line in FIG. 2 schematically illustrates a path of optical signals that reflect at the first conductor layer 3 and the glass fabric 13 and propagate in the insulating layer 12. Symbol $L_2$ shown by the broken line in FIG. 2 schematically illustrates a path of optical signals that reflect at the second conductor layer 4 and the glass fabric 13 and propagate in the insulating layer 12. Optical signals (optical signals in the path $L_1$) that propagate between the first conductor layer 3 and the glass fabric 13 reflect at the glass fabric 13, and some of the optical signals pass through the glass fabric 13 and travel on the second conductor layer 4 side (optical signals in the path $L_2$). The optical signals (optical signals in the path $L_2$) reflected at the second conductor layer 4 then reflect at the glass fabric 13 and travel on the second conductor layer 4 side, and some of the optical signals pass through the glass fabric 13 and travel on the first conductor layer 3 side. The optical signals that pass through the glass fabric 13 and travel on the first conductor layer 3 side are combined with optical signals in the path $L_1$, the optical signals propagating on the first conductor layer 3 side, and travel. The combined optical signals are emitted from an inclined plane 10 of the insulating layer 12 and received by a photodetector 6.

As illustrated in FIG. 2, the distance between the first conductor layer 3 and the glass fabric 13 embedded in the insulating layer 12 is smaller than the distance between the first conductor layer 3 and the second conductor layer 4, and is about a half of the distance between the second conductor layer 4 and the first conductor layer 3. That is, in the photoelectric hybrid substrate 11, optical signals propagate a portion of the insulating layer 12 having a thickness that is about a half of the thickness (the distance between the first conductor layer 3 and the second conductor layer 4) of the insulating layer 12 when the glass fabric 13 is not embedded in the insulating layer 12. Thus, the path of optical signals that propagate in the insulating layer 12 is shortened, and the loss of optical transmission is reduced.

The upper limit of an average thickness of the glass fabric 13 is preferably 30 µm, and more preferably 15 µm. The lower limit of the average thickness of the glass fabric 13 is preferably 1 µm, and more preferably 2 µm. When the average thickness of the glass fabric 13 exceeds the upper limit, the glass fabric 13 has an unnecessarily large thickness, and it may become difficult to reduce the thickness of the photoelectric hybrid substrate 11. When the average thickness of the glass fabric 13 is less than the lower limit, optical components that pass through the glass fabric 13 increase and the effect of reducing the loss of optical signals may not be obtained.

The glass fabric 13 embedded in a middle layer of the insulating layer 12 is obtained by forming glass into a fabric. According to the photoelectric hybrid substrate 11, by using the glass fabric 13, scattering of optical signals when the optical signals reflect at the glass fabric 13 can be suppressed, and the loss of optical transmission can be reduced.

The lower limit of an average linear density of the glass fabric 13 is preferably 50 fibers/25 mm, and more preferably 90 fibers/25 mm. The upper limit of the average linear density of the glass fabric 13 is preferably 120 fibers/25 mm, and more preferably 110 fibers/25 mm. When the average linear density of the glass fabric 13 is less than the lower limit, the amount of optical signals that pass through the glass fabric 13 increase, and the effect of reducing the loss of optical signals may not be obtained. When the average linear density of the glass fabric 13 exceeds the upper limit, the cost of the photoelectric hybrid substrate 11 may increase.

The lower limit of an average thickness of each of parts of the insulating layer 12, the parts being disposed between the glass fabric 13 and the first conductor layer 3 and between the glass fabric 13 and the second conductor layer 4, is preferably 5 µm, and more preferably 17.5 µm. The upper limit of the average thickness of each of the parts of the insulating layer 12 is preferably 55 µm, and more preferably 45.5 µm. When the average thickness of the parts of the insulating layer 12 exceeds the upper limit, the path of optical signals that propagate in the insulating layer 12 becomes long, thereby increasing the loss. Thus, the effect of reducing the loss of optical signals may not be obtained. In addition, it may become difficult to realize the reduction in the thickness of the photoelectric hybrid substrate 11. When the average thickness of the parts of the insulating layer 12 is less than the lower limit, the number of reflections of optical signals that propagate in the insulating layer 12 at the glass fabric 13 increases, which may result in an increase in the loss of the optical signals due to scattering during the reflection at the glass fabric 13.

[Advantages]

According to the photoelectric hybrid substrate 11, by embedding the glass fabric 13 in a middle layer of the insulating layer 12, rigidity of the photoelectric hybrid substrate 11 can be increased, a propagation path of optical signals in the insulating layer 12 can be shortened, and thus optical transmission at a lower loss can be realized.

Third Embodiment

Figure 3:
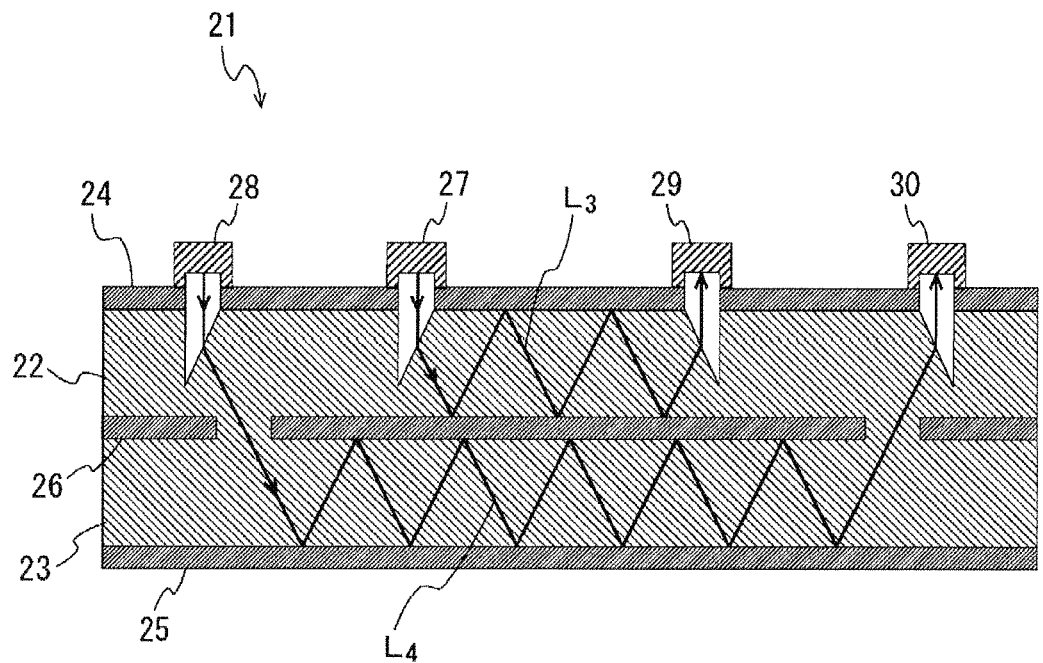
FIG. 3 is a schematic cross-sectional view of a photoelectric hybrid substrate according to a third embodiment of the present invention.

A photoelectric hybrid substrate 21 according to a third embodiment of the present invention illustrated in FIG. 3 is a substrate including three conductor layers. A second conductor layer 25, a second insulating layer 23, a third conductor layer 26, a first insulating layer 22, and a first conductor layer 24 are stacked in that order.

The first insulating layer 22 and the second insulating layer 23 are formed of a fluororesin that contains a fluororesin as a main component as in the insulating layer 2 of the first embodiment. The first conductor layer 24, the second conductor layer 25, and the third conductor layer 26 may be formed of the same material as the first conductor layer 3 and the second conductor layer 4 of the first embodiment.

A first light-emitting device 27, a second light-emitting device 28, a first photodetector 29, and a second photodetector 30 are mounted on an outer surface of the first conductor layer 24. In the photoelectric hybrid substrate 21, optical signals emitted from the first light-emitting device 27 are propagated in the first insulating layer 22 to transmit the optical signals to the first photodetector 29. In the photoelectric hybrid substrate 21, optical signals emitted from the second light-emitting device 28 are incident on the second insulating layer 23 through the first insulating layer 22 and are propagated in the second insulating layer 23 to transmit the optical signals to the second photodetector 30.

Symbol $L_3$ shown in FIG. 3 schematically illustrates a path of an optical signal transmitted from the first light-emitting device 27 to the first photodetector 29. Symbol $L_4$ shown in FIG. 3 schematically illustrates a path of an optical signal transmitted from the second light-emitting device 28 to the second photodetector 30. As shown by the path $L_3$, the photoelectric hybrid substrate 21 allows an optical signal emitted from the first light-emitting device 27 to reflect at the first conductor layer 24 and the third conductor layer 26 to propagate the optical signal in the first insulating layer 22 between the first conductor layer 24 and the third conductor layer 26. As shown by the path $L_4$, the photoelectric hybrid substrate 21 allows an optical signal emitted from the second light-emitting device 28 to reflect at the second conductor layer 25 and the third conductor layer 26 to propagate the optical signal in the second insulating layer 23 between the second conductor layer 25 and the third conductor layer 26.

In this manner, the photoelectric hybrid substrate 21 uses a plurality of insulating layers (the first insulating layer 22 and the second insulating layer 23) as transmission paths of optical signals. The photoelectric hybrid substrate 21 allows optical signals that propagate along the path $L_3$ and the path $L_4$ to reflect at the same third conductor layer 26 to respectively transmit the optical signals in the first insulating layer 22 and the second insulating layer 23. That is, the third conductor layer 26 is used in different transmission paths in common.

[Advantages]

The photoelectric hybrid substrate 21 has a structure in which optical signals that propagate in different insulating layers use, in common, a conductor layer at which the optical signals reflect. Accordingly, the number of conductor layers can be reduced compared with the case where conductor layers are provided for each insulating layer in which an optical signal propagates. With this structure, the cost of the photoelectric hybrid substrate 21 can be reduced, and a reduction in the thickness of the photoelectric hybrid substrate 21 can be realized.

Other Embodiments

It is to be understood that the embodiments disclosed herein are only illustrative and are not restrictive in all respects. The scope of the present invention is not limited to the configurations of the embodiments described above but is defined by the claims described below. It is intended that the scope of the present invention includes equivalents of the claims and all modifications within the scope of the claims.

In each of the embodiments described above, both a light-emitting device and a photodetector are disposed on an outer surface of the first conductor layer. Alternatively, a photodetector may be disposed on an outer surface of a conductor layer on the opposite side of a conductor layer having a light-emitting device thereon.

Figure 4:
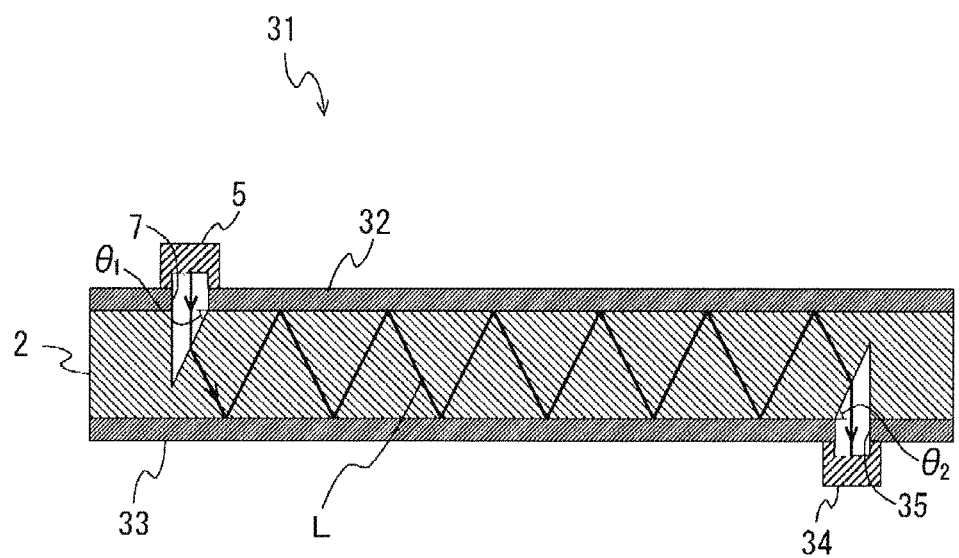
FIG. 4 is a schematic cross-sectional view of a photoelectric hybrid substrate according to another embodiment of the present invention.

In a photoelectric hybrid substrate 31 of another embodiment illustrated in FIG. 4, a photodetector 34 is disposed on a second conductor layer 33 on the opposite side of a first conductor layer 32 having a light-emitting device 5 thereon. In the photoelectric hybrid substrate 31, a second through-hole 35 for emitting an optical signal that has propagated in an insulating layer 2 to the outside is formed in the second conductor layer 33.

With this structure, an optical signal emitted from the light-emitting device 5 mounted on the first conductor layer 32 side is transmitted to the photodetector 34 mounted on a surface of the second conductor layer 33, the surface being disposed on the opposite side of the first conductor layer 32. Accordingly, the photoelectric hybrid substrate 31 can transmit a signal emitted from a surface side to another surface side through optical transmission.

In the second embodiment, a photoelectric hybrid substrate 11 in which a glass fabric is embedded in a middle layer of an insulating layer has been described. Alternatively, in the photoelectric hybrid substrate, a member other than the glass fabric may be embedded in a middle layer of the insulating layer as a member that reinforces rigidity of the photoelectric hybrid substrate and reflects optical signals in an insulating layer to propagate the optical signals. For example, instead of the glass fabric 13 of the photoelectric hybrid substrate 11 in FIG. 2, a fabric obtained by forming aramid fibers, liquid crystal polymer (LCP) fibers, or the like into a fabric may be embedded in a middle layer of the insulating layer. Also in such a photoelectric hybrid substrate, an improvement in rigidity of the photoelectric hybrid substrate and the effect of reducing a loss of optical signals are obtained.

In each of the embodiments described above, optical signals transmitted from a light-emitting device to a photodetector may be optical signals having a single frequency or optical signals having a plurality of frequencies.

INDUSTRIAL APPLICABILITY

According to the photoelectric hybrid substrate of the present invention, the photoelectric hybrid substrate has good productivity, and a wide region for mounting an electronic component can be ensured as described above. Therefore, the photoelectric hybrid substrate can be used in, for example, electrical equipment that requires a high-processing speed, and the cost of such electrical equipment can be reduced.

The invention claimed is:

1. A photoelectric hybrid substrate comprising an insulating layer that contains a fluororesin as a main component; and conductor layers stacked on two surfaces of the insulating layer,
   wherein the photoelectric hybrid substrate includes an optical communication mechanism configured to propagate an optical signal in the insulating layer by using reflection at inner surfaces of the conductor layers, and
   wherein the optical communication mechanism includes a light-emitting portion that emits an optical signal and a light-receiving portion that receives the optical signal,
   the light-emitting portion includes a through-hole formed in one of the pair of conductor layers and a light-emitting device that emits an optical signal to this through-hole, and
   the light-receiving portion includes a through-hole formed in one of the pair of conductor layers and a photodetector that receives the optical signal emitted from this through-hole, and
   a pair of surfaces of the insulating layer exposed in the through-hole of the light-emitting portion and in the through-hole of the light-receiving portion each have an inclined plane that is inclined outwardly in a direction in which the light-emitting portion and the light-receiving portion face each other and extends to the inside of the insulating layer, and
   the inclined plane has an inclination angle of 64° or more and 68° or less.

2. The photoelectric hybrid substrate according to claim 1, wherein the inner surfaces of the conductor layers each have an arithmetic mean roughness Ra of 1.5 μm or less.

3. The photoelectric hybrid substrate according to claim 1, wherein the insulating layer has an average thickness of 21 μm or more and 120 μm or less.

4. The photoelectric hybrid substrate according to claim 1, wherein the optical communication mechanism includes no separate optical waveguide in the insulating layer.

5. The photoelectric hybrid substrate according to claim 1, wherein the optical signal of the optical communication mechanism has a wavelength of 0.8 μm or more and 1.7 μm or less.

6. The photoelectric hybrid substrate according to claim 1, wherein a glass fabric is embedded in a middle layer of the insulating layer.

7. The photoelectric hybrid substrate according to claim 6, wherein the glass fabric has an average linear density of 50 fibers/25 mm or more.

* * * * *